(12) United States Patent
Murakami et al.

(10) Patent No.: US 10,270,365 B2
(45) Date of Patent: Apr. 23, 2019

(54) POWER CONVERSION DEVICE

(71) Applicant: DENSO CORPORATION, Kariya, Aichi-pref. (JP)

(72) Inventors: Tatsuya Murakami, Nishio (JP); Yuji Hayashi, Nishio (JP); Satoru Yoshikawa, Nishio (JP); Satoshi Takada, Kariya (JP); Masakazu Fukada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 30 days.

(21) Appl. No.: 15/547,602

(22) PCT Filed: Feb. 5, 2016

(86) PCT No.: PCT/JP2016/000604
§ 371 (c)(1),
(2) Date: Jul. 31, 2017

(87) PCT Pub. No.: WO2016/132700
PCT Pub. Date: Aug. 25, 2016

(65) Prior Publication Data
US 2018/0062497 A1    Mar. 1, 2018

(30) Foreign Application Priority Data

Feb. 16, 2015    (JP) ................. 2015-027910

(51) Int. Cl.
*H02M 1/32*     (2007.01)
*H02M 7/5387*   (2007.01)
(Continued)

(52) U.S. Cl.
CPC ......... *H02M 7/53871* (2013.01); *H02M 1/32* (2013.01); *H02M 7/48* (2013.01);
(Continued)

(58) Field of Classification Search
CPC .... H02M 1/32; H02M 3/3376; H02M 7/5387; H02M 7/53871; H02M 7/539; H02M 7/5395; H02M 2001/0054
See application file for complete search history.

(56) References Cited

U.S. PATENT DOCUMENTS 4,608,499 A * 8/1986 Rathmann ........... H02M 1/4208
                                                            307/66
5,191,262 A * 3/1993 Nilssen ............. H02M 7/53832
                                                            315/209 R
(Continued)

FOREIGN PATENT DOCUMENTS

JP    2007082317 A    3/2007
JP    2008278558 A    11/2008

*Primary Examiner* — Fred E Finch, III
(74) *Attorney, Agent, or Firm* — Harness, Dickey & Pierce, P.L.C.

(57) ABSTRACT

A power conversion device includes an inverter which converts a DC power supplied thereto from a power supply device to an AC power using an operation of a switching element and outputs the AC power toward a load a current meter which measures an output current from the inverter, and a control unit which controls the operation of the switching element to change an output voltage waveform from the inverter. The control unit changes the output voltage waveform on the basis of the measured output current.

3 Claims, 10 Drawing Sheets

(51) Int. Cl.
*H02M 7/48* (2007.01)
*H02M 7/539* (2006.01)
H02M 3/337 (2006.01)
H02M 1/00 (2006.01)

(52) U.S. Cl.
CPC .......... *H02M 7/539* (2013.01); *H02M 3/3376* (2013.01); *H02M 2001/0009* (2013.01); *H02M 2001/0054* (2013.01)

(56) References Cited

U.S. PATENT DOCUMENTS

| | | | | |
|---|---|---|---|---|
| 5,260,996 | A | * 11/1993 | Dillon | H02M 3/335 |
| | | | | 379/418 |
| 5,657,220 | A | * 8/1997 | Yan | H02M 7/539 |
| | | | | 363/132 |
| 2006/0215431 | A1 | * 9/2006 | Ely | H02M 7/48 |
| | | | | 363/131 |
| 2010/0020571 | A1 | * 1/2010 | Hashimoto | F02D 29/06 |
| | | | | 363/37 |
| 2010/0182810 | A1 | * 7/2010 | Ashikaga | H02M 7/53832 |
| | | | | 363/37 |
| 2013/0076142 | A1 | * 3/2013 | Johnson, Jr. | H02J 9/062 |
| | | | | 307/66 |
| 2016/0020693 | A1 | * 1/2016 | Ribarich | H02M 3/07 |
| | | | | 363/60 |

\* cited by examiner

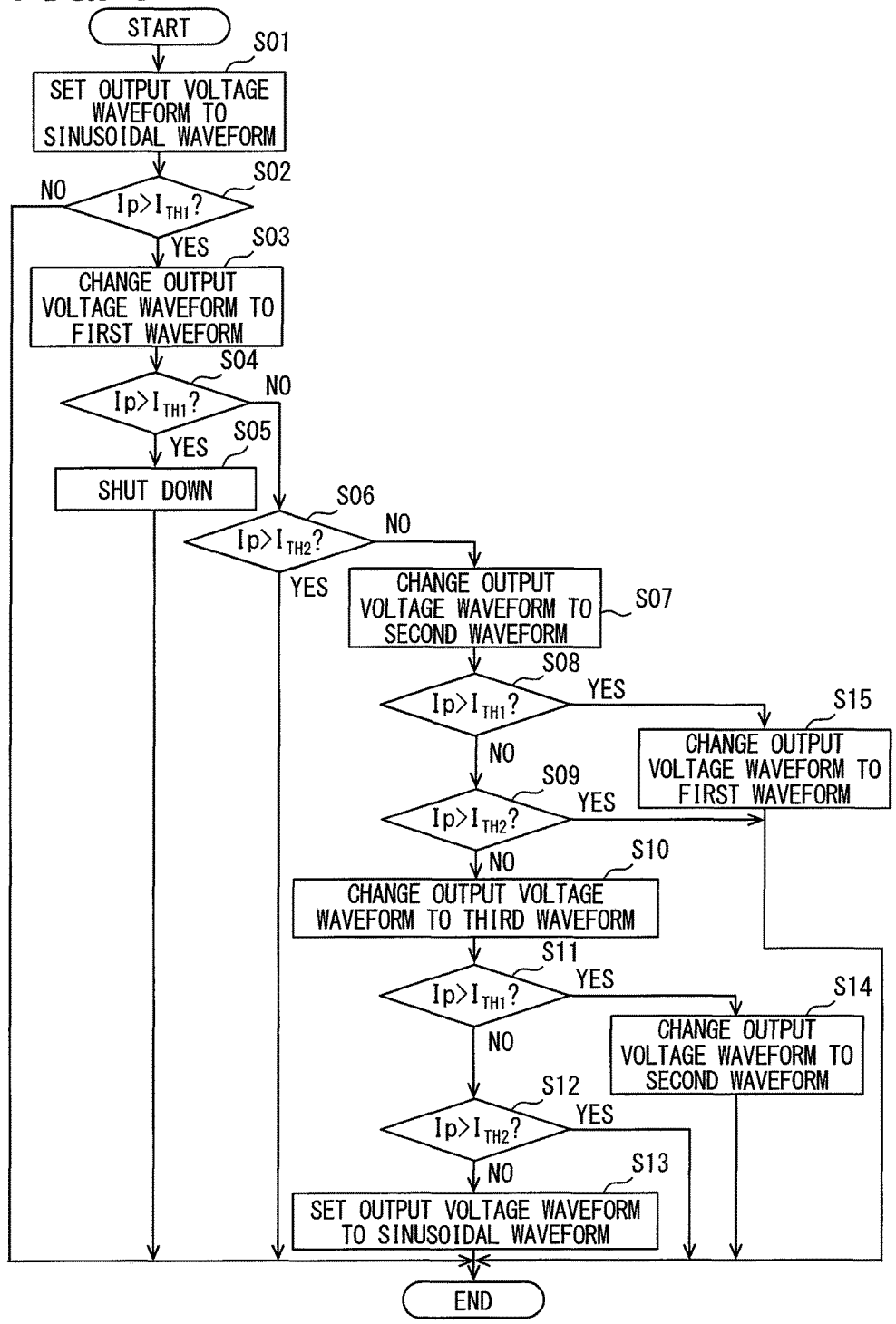

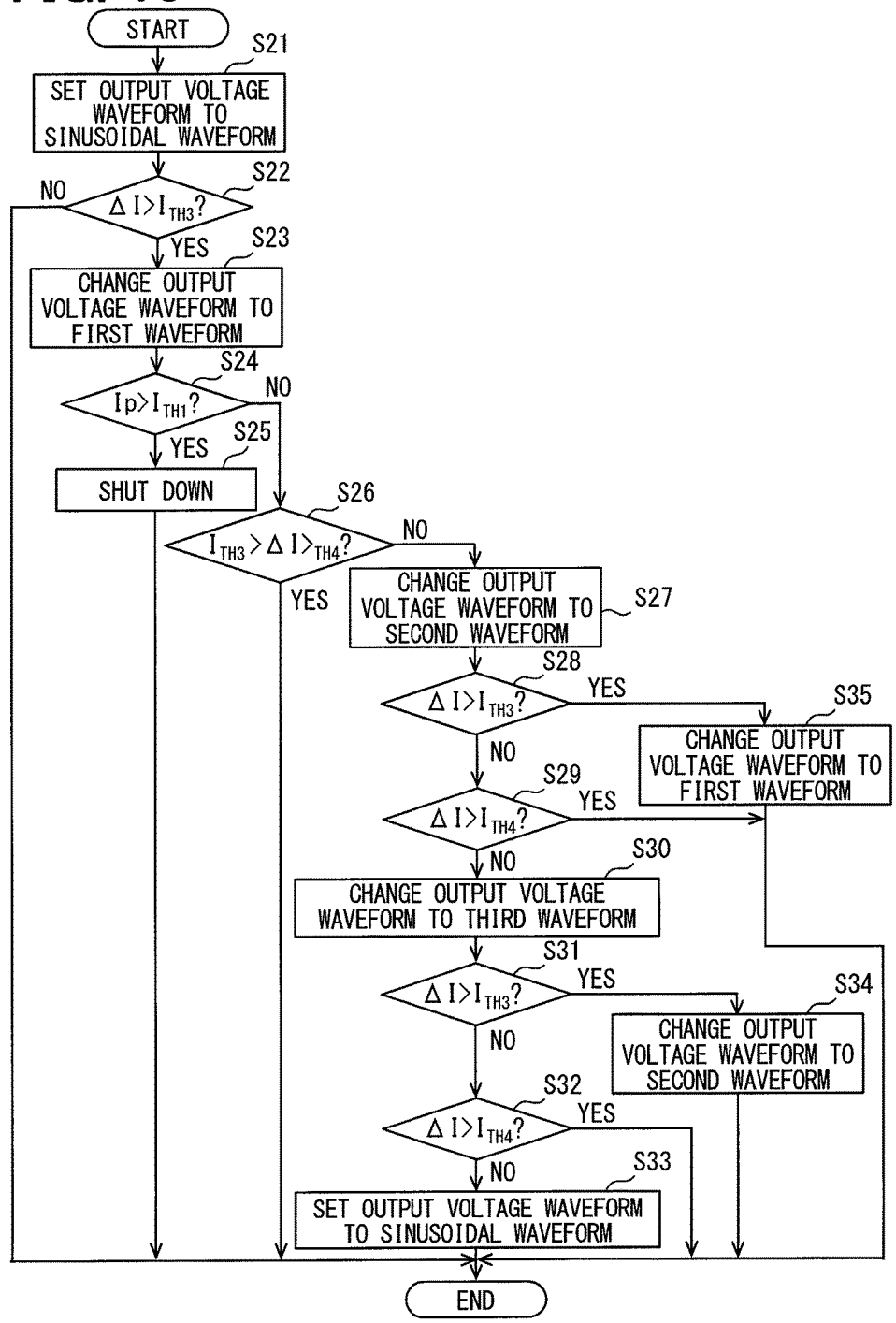

POWER CONVERSION DEVICE

CROSS REFERENCE TO RELATED APPLICATIONS

This application is a U.S. National Phase Application under 35 U.S.C. 371 of International Application No. PCT/JP2016/000604 filed on Feb. 5, 2016 and published in Japanese as WO 2016/132700 A1 on Aug. 25, 2016. This application is based on and claims the benefit of priority from Japanese Patent Application No. 2015-027910 filed on Feb. 16, 2015. The entire disclosures of all of the above applications are incorporated herein by reference.

TECHNICAL FIELD

The present disclosure relates to a power conversion device which converts a DC power supplied from a power supply source to an AC power and supplies the AC power to a load.

BACKGROUND ART

It is rare that the electric power obtained from a power supply source such as a solar cell, a fuel cell, or a dry cell is supplied directly to a load without any alteration. As necessary, the electric power obtained from the power supply source is subjected to boosting and power conversion from a DC power to an AC power, which is then supplied to the load.

As a power conversion device for performing such power conversion, devices in various forms have been proposed heretofore. The power conversion device described in Patent Literature 1 shown below includes a converter for boosting the DC power supplied from a power supply source (power generating device) and an inverter for converting the DC power to an AC power.

The inverter includes a plurality of switching elements and performs conversion from the DC power to the AC power by switching the opening and closing of the switching element at a predetermined duty. In the power conversion device described in Patent Literature 1 shown below, the switching element is operated such that the waveform of a voltage output as the AC power is not sinusoidal, but trapezoidal. Thus, a switching loss is reduced to improve conversion efficiency in the power conversion device.

PRIOR ART LITERATURE

Patent Literature

Patent Literature 1: JP 2007-82317 A

SUMMARY OF INVENTION

There are cases where, depending on the type of a load to which an AC power is supplied from a power conversion device, the relationship between the voltage and the current which are supplied to the load is not linear. For example, in such a case where a capacitor-input-type rectification circuit is provided in the power input portion of the load, even when the waveform of the output voltage from the power conversion device is sinusoidal, the waveform of the output current from the power conversion device (i.e., the input current to the load) is not sinusoidal.

In the capacitor-input-type rectification circuit, the AC power input thereto is converted to a DC power by a diode bridge including a plurality of diodes. When the voltage waveform of the power input to the diode bridge is sinusoidal, due to the fact that a current flows only when a forward voltage is applied to the diodes, the peak of the waveform of the output current from the power conversion device tends to increase. Accordingly, it is concerned that the current flowing in the switching element may exceed a maximum rated current.

In terms of being dedicated to suppressing the peak, it is preferable that the waveform of the output voltage from the power conversion device is not sinusoidal, but trapezoidal. However, since an AC power the output voltage of which has a trapezoidal waveform includes a high-frequency component, a so-called ripple is likely to occur in the output current from the power conversion device. As a result, noise due to the ripple may affect the operation of the load. In terms of being dedicated to reducing such noise, the waveform of the output voltage from the power conversion device is preferably rather sinusoidal.

Thus, in the power conversion device connected to the non-linear load, it is necessary to simultaneously suppress the peak of the waveform of the output current and suppress the noise of the output current. Patent Literature 1 described above only proposes providing the output current with trapezoidal waveform and gives no consideration to the accomplishment of the two tasks described above.

An object of the present disclosure is to provide a power conversion device capable of suppressing the peak of the waveform of an output current and also suppressing the noise of the output current.

According to an embodiment of the present disclosure, a power conversion device includes an inverter which converts a DC power supplied from a power supply source to an AC power using an operation of a switching element and outputs the AC power to a load, a current measurement unit which measures an output current from the inverter, and a control unit which controls the operation of the switching element to change an output voltage waveform from the inverter. The control unit changes the output voltage waveform on the basis of the measured output current.

In the power conversion device thus configured, the control of the operation of the switching element is performed by the control unit so as to change the output voltage waveform on the basis of the measured output current. For example, by performing such control as to appropriately change the output voltage waveform so as to minimize the noise within a range which allows the peak of the measured output current to be suppressed to a predetermined value or less (e.g., such control as to bring the trapezoidal output voltage waveform closer to a sinusoidal waveform), it is possible to simultaneously suppress the peak of the waveform of the output current and suppress the noise of the output current. Thus, the power conversion device capable of suppressing the peak of the waveform of the output current and also suppressing the noise of the output current is provided.

BRIEF DESCRIPTION OF DRAWINGS

The above and other objects, features and advantages of the present disclosure will become more apparent from the following detailed description made with reference to the accompanying drawings, in which:

FIG. 6 is a flow chart showing the flow of a process performed in the power conversion device;

FIG. 10 is a flow chart showing the flow of a process performed in the power conversion device.

DESCRIPTION OF EMBODIMENTS

Figure 1:
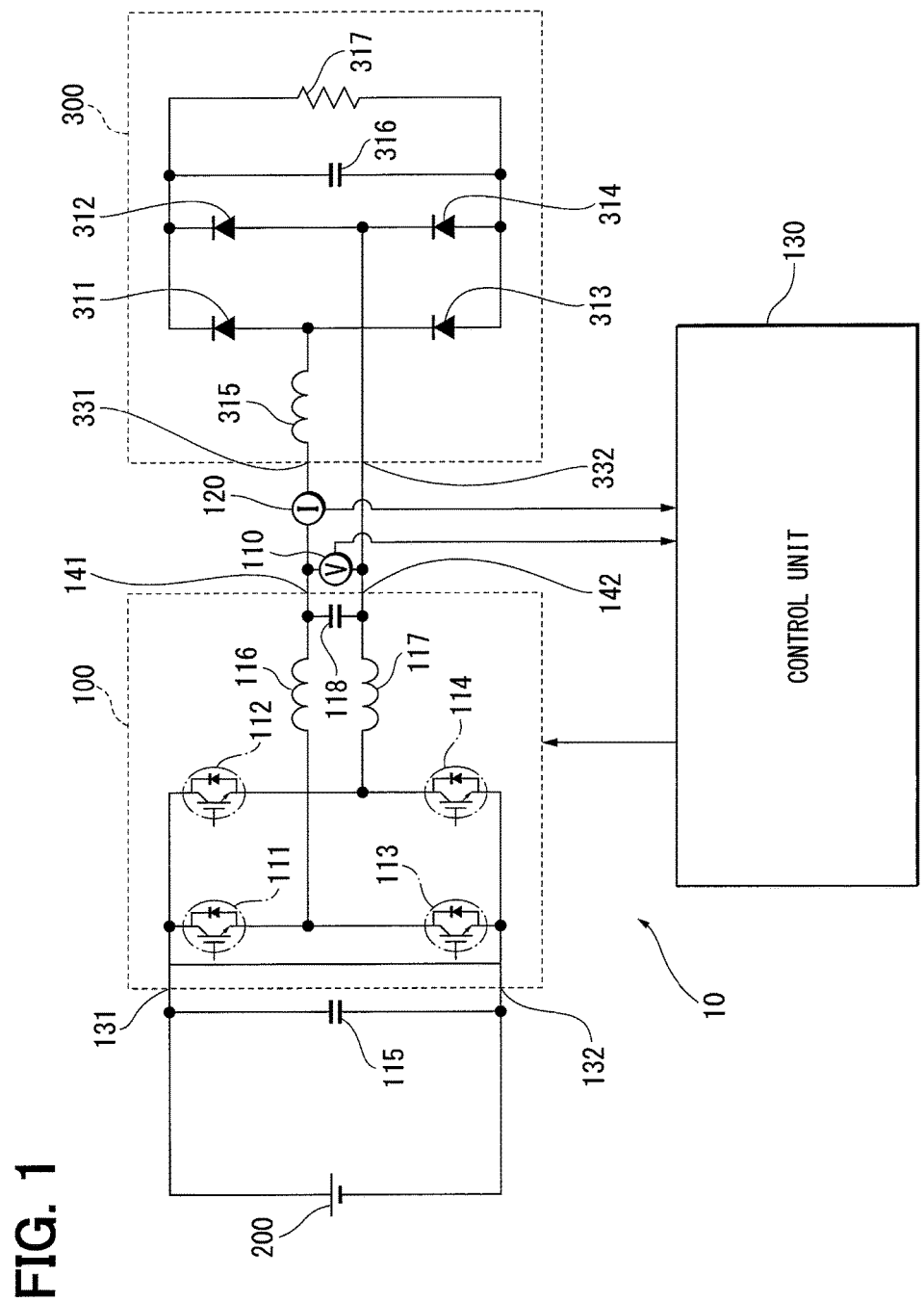
FIG. 1 is a view schematically showing a configuration of a power conversion device according to an embodiment of the present disclosure.

The following will describe an embodiment of the present disclosure with reference to accompanying drawings. For easier understanding of the description, the same components in the individual drawings are designated by the same reference numerals wherever possible, and a repeated description thereof is omitted.

Referring to FIG. 1, a configuration of a power conversion device 10 according to the present embodiment will be described. The power conversion device 10 converts a DC power supplied from a power supply device 200 (power supply source) to an AC power and outputs the AC power to a load 300.

The power supply device 200 is a power generation device which generates a DC power and supplies the DC power to the outside, which is specifically a solar cell device. However, in practicing the present disclosure, a specific embodiment of the power supply device is not particularly limited. The power supply device 200 may also be a wind force power generation device or a fuel cell device. Alternatively, the power supply device 200 may also be a device which supplies a preliminarily stored power to the outside such as, e.g., a storage cell, instead of a device which generates power to produce a DC power.

The load 300 is a device which receives a supply of an AC power to operate. The load 300 includes power input terminals 331 and 332, diodes 311, 312, 313, and 314, a capacitor 316, and a resistor 317.

The power input terminals 331 and 332 are a pair of terminals to which the AC power is input from the power conversion device 10. The four diodes 311, 312, 313, and 314 and the capacitor 316 form a capacitor-input-type rectification circuit. Between the power input terminal 331 and the capacitor-input-type rectification circuit, a smoothing reactor 315 is disposed.

When the AC power is input to the power input terminals 331 and 332, the AC power is converted by the capacitor-input-type rectification circuit to the DC power, which is supplied to the resistor 317 and consumed. Note that the resistor 317 is shown as one electric resistor which virtually represents the entire part that operates with the power converted to the DC power by the rectification circuit.

The power conversion device 10 disposed between the power supply device 200 and the load 300 includes an inverter 100, a voltage meter 110, a current meter 120, and a control unit 130.

The inverter 100 is a part which converts the DC power to the AC power. The inverter 100 includes power input terminals 131 and 132, switching elements 111, 112, 113, and 114, and power output terminals 141 and 142.

The power input terminals 131 and 132 are a pair of terminals to which the DC power is input from the power supply device 200. Between the power input terminals 131 and 132, a smoothing capacitor 115 is connected.

The switching elements 111, 112, 113, and 114 are identical IGBTs which collectively form a full-bridge inverter circuit. On the basis of a control signal transmitted from the control unit 130 described later, the open/close operations of the switching elements 111, 112, 113, and 114 are performed to thus convert the DC power to the AC power.

The power output terminals 141 and 142 are a pair of terminals for outputting the AC power generated in the full-bridge inverter circuit described above to the outside (i.e., to the load 300). Between the full-bridge inverter circuit and the power output terminals 141 and 142, smoothing reactors 116 and 117 and a capacitor 118 are disposed.

The voltage meter 110 is intended to measure the voltage between the power output terminals 141 and 142, i.e., the voltage of the AC power output from the power conversion device 10 (hereinafter referred to also as an "output voltage"). The value of the output voltage measured by the voltage meter 110 is constantly input to the control unit 130.

The current meter 120 is intended to measure the current output from the power output terminal 141, i.e., the current of the AC power output from the power conversion device 10 (hereinafter referred to also as an "output current"). The value of the output current measured by the current meter 120 is constantly input to the control unit 130.

The control unit 130 is a computer system including a CPU, a ROM, a RAM, an input/output interface, and the like, which is intended to control the overall operation of the power conversion device 10. As has already been described, the control unit 130 transmits the control signal for controlling the open/close operations of each of the switching elements 111, 112, 113, and 114 to the inverter 100. Thus, the power converting operation in the inverter 100 is controlled, and the waveform of the output voltage is adjusted.

The capacitor-input-type rectification circuit included in the load 300 is known as a so-called "non-linear" circuit. That is, in the capacitor-input-type rectification circuit, the relationship between the voltage input to the circuit and the current which consequently flows is not linear.

Figure 2:
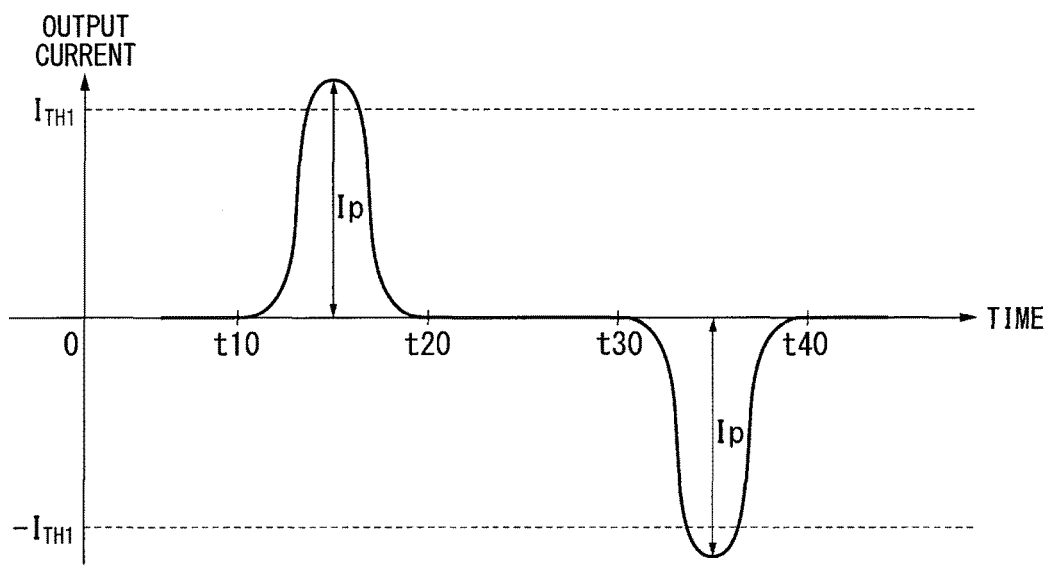
FIG. 2 is a graph showing an output current waveform from the power conversion device.

FIG. 2 shows an example of the waveform of the output current when the output voltage (not shown) has a sinusoidal waveform. As shown in the drawing, the waveform of the output current is not sinusoidal and is 0 during the time period before a time t10, the time period from a time t20 to a time t30, and the time period after a time t40. This is because, due to the voltage in the capacitor 316, a reverse voltage is temporarily applied to the diode 311 or the like.

As the output voltage having the sinusoidal waveform gradually increases, at the time (each of times t10 and t30) when the voltage applied to the diode 311 or the like exceeds the voltage in the capacitor 316, the absolute value of the output current begins to increase.

Note that, during the time period during which the output current does not flow, the energy of the power supplied from the inverter 100 to the load 300 is gradually stored. When the output current begins to flow, the energy is released at a time to rapidly increase the output current. As a result, the output current has a relatively large peak value $I_P$. The increased peak value $I_P$ may possibly cause the breakdown of the switching element 111 or the like and the diode 311 or the like, and is therefore undesirable. In particular, when the load 300 includes an electronic component having a low maximum rated current, such a possibility increases.

The power conversion device 10 according to the present embodiment is, therefore, configured to appropriately change the waveform of the output voltage on the basis of the value of the output current measured by the current meter 120. Specifically, the power conversion device 10 is configured to prepare a plurality of the waveforms of the output voltage in advance and select an appropriate waveform thereamong.

Figure 3A:
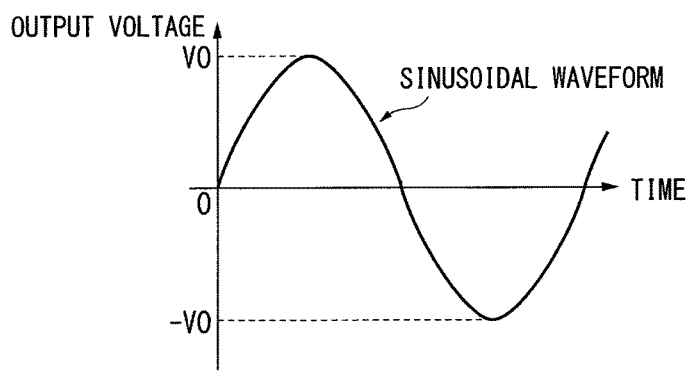
FIGS. 3A to 3D are graphs each showing the output current waveform from the power conversion device.

In the present embodiment, the four waveforms shown in FIGS. 3A to 3D are prepared in advance as the waveforms of the output voltage. The waveform shown in FIG. 3A is a sinusoidal waveform which is normally input. In the drawing, the amplitude of the sinusoidal waveform, i.e., the maximum value of the voltage is shown as "Voltage V0".

Each of the waveform (hereinafter referred to as "First Waveform") shown in FIG. 3B, the waveform (hereinafter referred to as "Second Waveform") shown in FIG. 3C, and the waveform shown in FIG. 3D (hereinafter referred to as "Third Waveform") is a trapezoidal waveform.

Figure 3B:
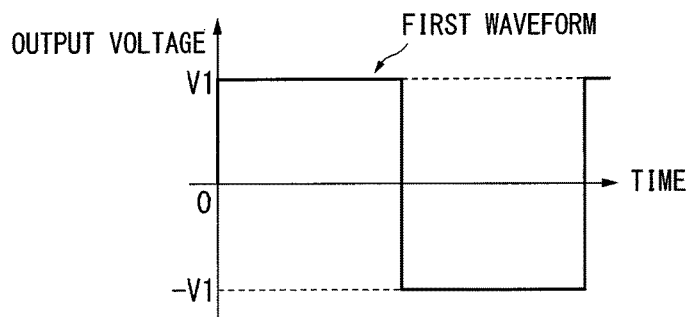
Figure 3C:
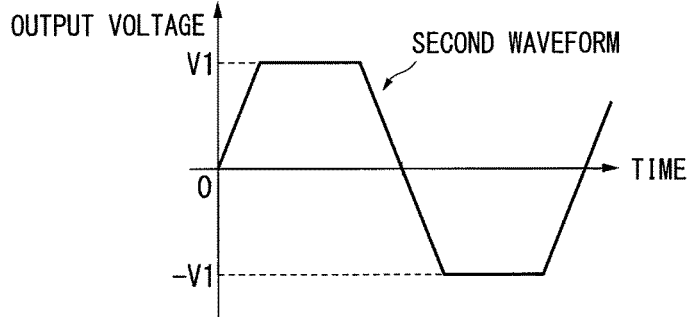

However, the first waveform of FIG. 3B is a waveform having an inclination angle (angle relative to the time axis as the abscissa axis) of 90 degrees during each rising or falling transition of the voltage, i.e., a square waveform. The second waveform of FIG. 3C has an inclination angle which is gentler than that of the first waveform during each rising or falling transition of the voltage. The third waveform of FIG. 3D has an inclination angle which is gentler than that of the second waveform during each rising or falling transition of the voltage.

The cycle period of each of the first, second, and third waveforms is the same as the cycle period of the first waveform. Also, the amplitude of each of the first, second, and third waveforms is the same voltage V1. Note that the value of the voltage V1 is smaller than the value of the voltage V0. However, the effective value of the voltage in each of the first, second, and third waveforms is substantially equal to the effective value of the voltage in the first waveform.

Figure 4A:
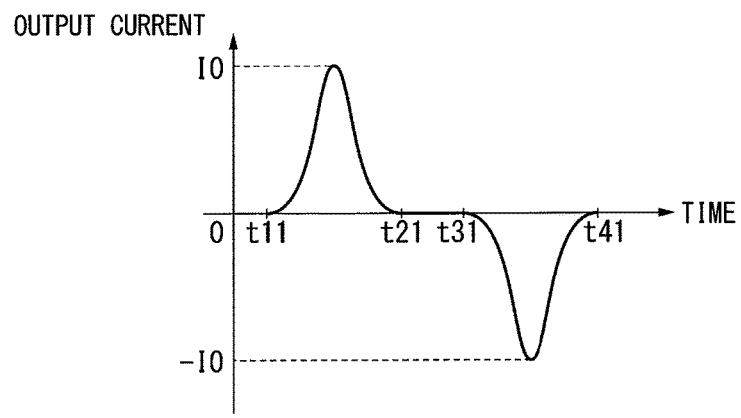
FIGS. 4A to 4C are graphs each showing the output current waveform from the power conversion device.
Figure 4B:
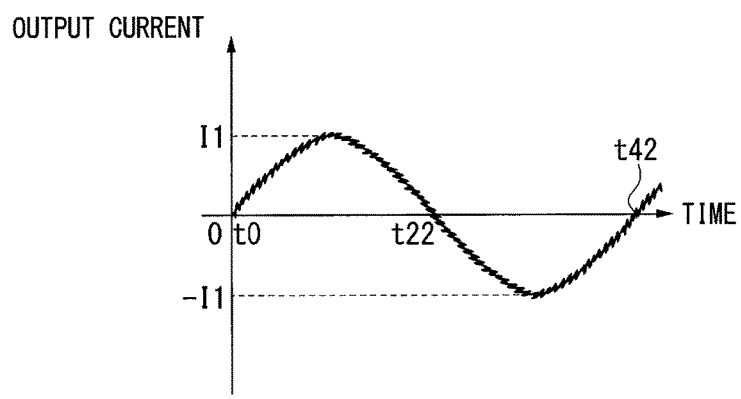
Figure 4C:
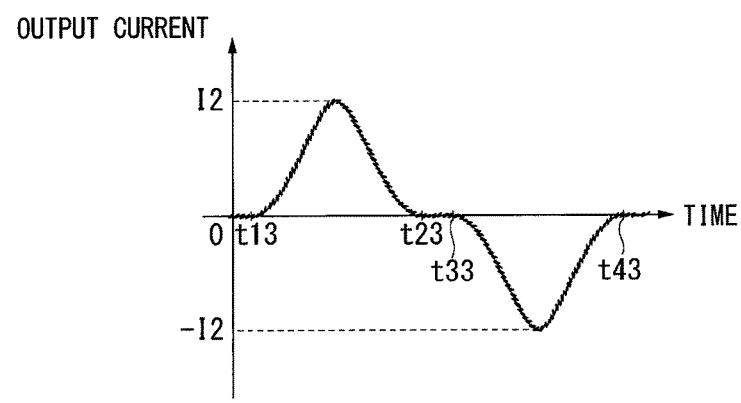

The influence of changing the waveform of the output voltage to any of these waveforms will be described with reference to FIGS. 4A to 4C. FIG. 4A shows the waveform of the output current when the output voltage has the sinusoidal waveform of FIG. 3A. FIG. 4B shows the waveform of the output current when the output voltage has the first waveform of FIG. 3B. FIG. 4C shows the waveform of the output current when the output voltage has the second waveform of FIG. 3C.

As shown in FIG. 4A, when the output voltage has the sinusoidal waveform, the time period during which the output current is 0 (time period from a time t21 to the time t31) is longest. Also, the peak value $I_P$ of the output current is largest (I0).

As shown in FIG. 4B, when the output voltage has the first waveform (square waveform), there is substantially no time period during which the output current is 0. Also, the peak value $I_P$ of the output current is smallest (I1).

As shown in FIG. 4C, when the output voltage has the second waveform, the time period (time period from a time t23 to a time t33) during which the output current is 0 is shorter than in the case of FIG. 4A. Also, the peak value $I_P$ of the output current is smaller than that (I0) in the case of FIG. 4A and larger than that (I1) in the case of FIG. 4B.

Figure 3D:
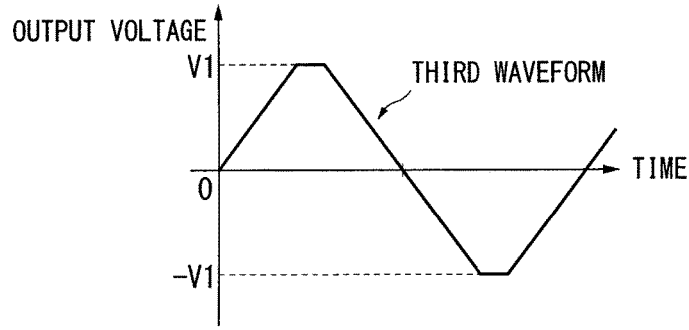

When the output voltage has the third waveform of FIG. 3D, the peak value $I_P$ of the output current is larger than I2 and smaller than I0, though not shown in FIGS. 4A to 4C.

Thus, the peak value $I_P$ of the output current is largest when the output voltage has the sinusoidal waveform. When the output voltage is provided with the trapezoidal waveform, as the inclination thereof during a rising transition of the voltage is increased, the peak value $I_P$ decreases. Accordingly, in terms of being dedicated to suppressing the peak value $I_P$, it is desirable to provide the output voltage with the trapezoidal waveform and maximize the inclination thereof during a rising transition of the voltage.

However, an AC power the output voltage of which has a trapezoidal waveform includes a high-frequency component so that a so-called ripple (pulsation) is likely to occur in the output current. As shown in FIG. 4A, when the output voltage has the sinusoidal waveform, the ripple scarcely occurs. On the other hand, when the output voltage has the trapezoidal waveform, the ripple begins to occur. As shown in FIG. 4B, when the output voltage has the square waveform, the magnitude of the ripple is maximum.

That is, by appropriately selecting a waveform for the output voltage, it is possible to change the peak value $I_P$ of the output current and the ripple. However, the relationship between the peak value $I_P$ and the ripple is a trade-off. In view of this point, in the power conversion device 10, the waveform of the output voltage is changed depending on the situation.

Figure 5:
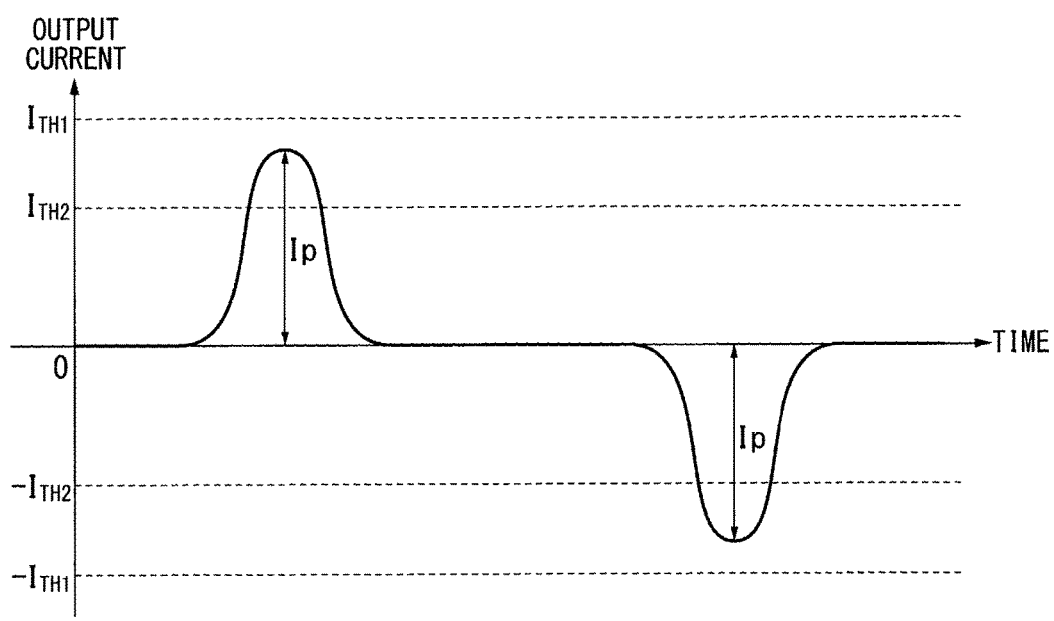
FIG. 5 is a graph showing the output current waveform from the power conversion device.

As shown in FIG. 5, in the present embodiment, two thresholds (first threshold $I_{TH1}$ and second threshold $I_{TH2}$) are set for the peak value $I_P$. The first threshold $I_{TH1}$ is set as the upper limit value of the peak value $I_P$, which is a value smaller than the maximum rated current of the switching element 111 or the like. On the other hand, the second threshold $I_{TH2}$ is set as the lower limit value of the peak value $I_P$, which is set as a value smaller than the first threshold $I_{TH1}$.

The range of the peak value $I_P$ determined by the first and second thresholds $I_{TH1}$ and $I_{TH2}$ is set as a range which reliably prevents the switching element 111 or the like from breaking down and prevents the ripple from becoming excessively large. The range of the peak value $I_P$ is hereinafter referred to also as an "appropriate range". In the present embodiment, the changing of the waveform of the output voltage is performed such that the peak value $I_P$ falls within the appropriate range wherever possible.

The specific content of the control performed by the power conversion device 10 will be described with reference to FIG. 6. The sequential process shown in FIG. 6 is performed immediately after the supply of the power from the power conversion device 10 to the load 300 is started.

First, in S01, the waveform of the output voltage is set to the sinusoidal waveform. That is, the output voltage having the waveform shown in FIG. 3A is input to the load 300.

In S02 subsequent to S01, it is determined whether or not the peak value $I_P$ measured by the current meter 120 is larger than the first threshold $I_{TH1}$. When the peak value $I_P$ is not larger than the first threshold $I_{TH1}$, the peak value $I_P$ need not be suppressed by changing the output voltage so that the sequential process shown in FIG. 6 is ended. After that, the state where the output voltage has the sinusoidal waveform is sustained.

In S02, when the peak value $I_P$ is larger than the first threshold $I_{TH1}$, the process moves to S03. In S03, the waveform of the output voltage is changed from the sinusoidal waveform to the first waveform. That is, the open/close operations of the switching element 111 or the like are switched by the control unit 130 such that the output voltage has the first waveform of FIG. 3B.

In S04 subsequent to S03, it is determined again whether or not the peak value $I_P$ is larger than the first threshold $I_{TH1}$. When the peak value $I_P$ is larger than the first threshold $I_{TH1}$, the process moves to S05.

The peak value $I_P$ which is larger than the first threshold $I_{TH1}$ even after the waveform of the output voltage is changed to the first waveform means that it is impossible to further suppress the peak value $I_P$ and thus allow the peak value $I_P$ to be not larger than the first threshold $I_{TH1}$. Accordingly, when the process moves to S05, the control unit 130 shuts down the power conversion device 10 and ends the sequential process shown in FIG. 6.

In S04, when the peak value $I_P$ is not larger than the first threshold $I_{TH1}$, the process moves to S06. In S06, it is determined whether or not the peak value $I_P$ is larger than the second threshold $I_{TH2}$. When the peak value $I_P$ is larger than the second threshold $I_{TH2}$, the peak value $I_P$ falls within the appropriate range. Therefore, it is unnecessary to further change the output voltage so that the sequential process shown in FIG. 6 is ended. After that, the state where the output voltage has the first waveform is sustained.

In S06, when the peak value $I_P$ is not larger than the second threshold $I_{TH2}$, the process moves to S07. In S07, the waveform of the output voltage is changed from the first waveform to the second waveform. That is, the open/close operations of the switching element 111 or the like are switched by the control unit 130 such that the output voltage has the second waveform of FIG. 3C.

In S08 subsequent to S07, it is determined again whether or not the peak value $I_P$ is larger than the first threshold $I_{TH1}$. When the peak value $I_P$ is larger than the first threshold $I_{TH1}$, the process moves to S15.

The movement of the process to S15 means that, as a result of changing the waveform of the output voltage from the first waveform to the second waveform, the peak value $I_P$ becomes excessively large. Accordingly, in S15, the waveform of the output voltage is returned to the first waveform. Then, the sequential process shown in FIG. 6 is ended. After that, the state where the output voltage has the first waveform is sustained.

In S08, when the peak value $I_P$ is not larger than the first threshold voltage $I_{TH1}$, the process moves to S09. In S09, it is determined whether or not the peak value $I_P$ is larger than the second threshold $I_{TH2}$. When the peak value $I_P$ is larger than the second threshold $I_{TH2}$, the peak value $I_P$ is within the appropriate range. Therefore, the output voltage need not be further changed so that the sequential process shown in FIG. 6 is ended. After that, the state where the output voltage has the second waveform is sustained.

In S09, when the peak value $I_P$ is not larger than the second threshold $I_{TH2}$, the process moves to S10. In S10, the waveform of the output voltage is changed from the second waveform to the third waveform. That is, the open/close operations of the switching element 111 or the like are switched by the control unit 130 such that the output voltage has the third waveform of FIG. 3D.

In S11 subsequent to S10, it is determined again whether or not the peak value $I_P$ is larger than the first threshold $I_{TH1}$. When the peak value $I_P$ is larger than the first threshold $I_{TH1}$, the process moves to S14.

The movement of the process to S14 means that, as a result of changing the waveform of the output voltage from the second waveform to the third waveform, the peak value $I_P$ becomes excessively large. Accordingly, in S14, the waveform of the output voltage is returned to the second waveform. Then, the sequential process shown in FIG. 6 is ended. After that, the state where the output voltage has the second waveform is sustained.

In S11, when the peak value $I_P$ is not larger than the first threshold $I_{TH1}$, the process moves to S12. In S12, it is determined whether or not the peak value $I_P$ is larger than the second threshold $I_{TH2}$. When the peak value $I_P$ is larger than the second threshold $I_{TH2}$, the peak value $I_P$ is within the appropriate range. Accordingly, the output voltage need not be further changed so that the sequential process shown in FIG. 6 is ended. After that, the state where the output voltage has the third waveform is sustained.

In S12, when the peak value $I_P$ is not larger than the second threshold $I_{TH2}$, the process moves to S13. The movement of the process to S13 means that, even when the waveform of the output voltage is changed to any of the waveforms shown in FIG. 3, the peak value $I_P$ does not fall within the appropriate range (and is smaller than the first threshold voltage $I_{TH1}$). Accordingly, in S13, the waveform of the output voltage is returned from the third waveform to the sinusoidal waveform. That is, the open/close operations of the switching element 111 or the like are switched by the control unit 130 such that the output voltage has the sinusoidal waveform of FIG. 3A. Then, the sequential process shown in FIG. 6 is ended. After that, the state where the output voltage has the initial sinusoidal waveform is sustained.

As described above, in the power conversion device 10 according to the present embodiment, control is performed such that the waveform of the output voltage is changed on the basis of the output current measured by the current meter 120 to allow the peak value $I_P$ of the output current to fall within the appropriate range wherever possible. This simultaneously suppresses the peak value $I_P$ of the output current and suppresses the noise (ripple) of the output current.

The types of the waveforms of the output voltage prepared in advance are not limited to those as shown in FIGS. 3A to 3D. For example, the embodiment may also be such that such waveforms of the output voltage as shown in FIGS. 7A to 7D are prepared in advance, and an appropriate selection is made among these waveforms.

Figure 7A:
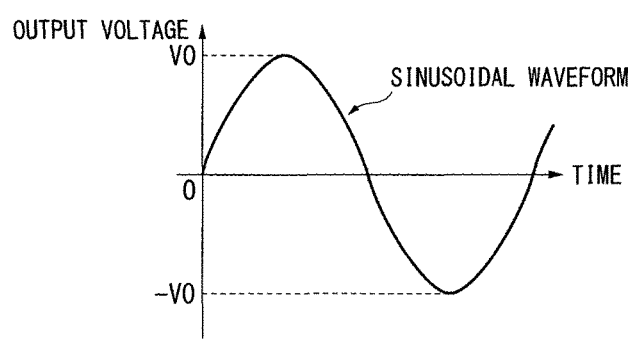
FIGS. 7A to 7D are graphs each showing the output voltage waveform from the power conversion device.
Figure 7B:
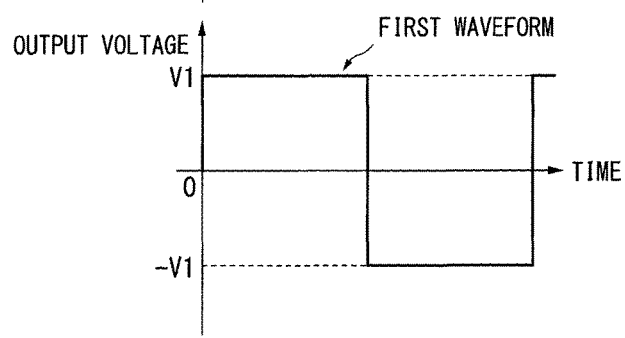

In this example, the sinusoidal waveform of FIG. 7A and the first waveform of FIG. 7B are the same as the sinusoidal waveform of FIG. 3A and the first waveform of FIG. 3B.

Figure 7C:
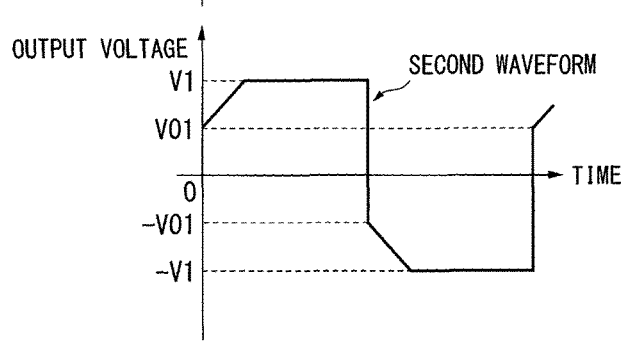

On the other hand, as shown in FIG. 7C, the second waveform is such that, during a rising transition, the voltage rises to a voltage V01 at an inclination angle of 90 degrees and then rises to the voltage V1 at a gentle inclination angle. During a falling transition from the voltage V1, the second waveform is such that the voltage decreases to a voltage (−V01) at an inclination angle of 90 degrees.

Figure 7D:
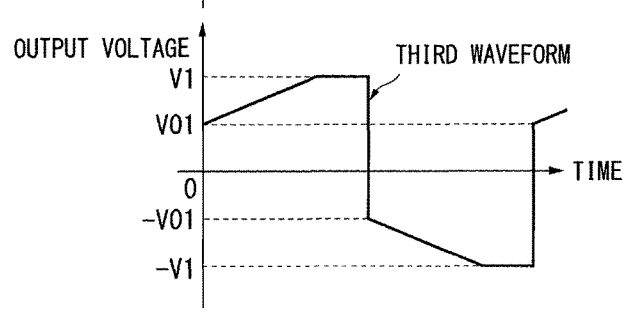

As shown in FIG. 7D, the third waveform is such that, during a rising transition, the voltage rises to the voltage V01 at an inclination angle of 90 degrees and then rises to the voltage V1 at an inclination angle (much gentler than that of the second waveform). During a falling transition from the voltage V1, the third waveform is such that the voltage decreases to the voltage (−V01) at an inclination angle of 90 degrees.

Even when waveforms which are different from each other only in the inclination angle (inclination) during a rising transition are thus prepared as the first, second, and third waveforms, the effects of the present disclosure can be achieved. Note that the process of selecting an appropriate waveform from among the sinusoidal waveform, the first waveform, the second waveform, and the third waveform shown in FIGS. 7A to 7D and changing the waveform of the output voltage is the same as the process described with reference to FIG. 6. Accordingly, a specific description thereof is omitted.

The shapes of the waveforms of the output voltage prepared in advance are not limited to trapezoidal waveforms. For example, the embodiment may also be such that the waveforms of the output voltage shown in FIGS. 8A to 8D are prepared in advance, and an appropriate selection is made among these waveforms.

Figure 8A:
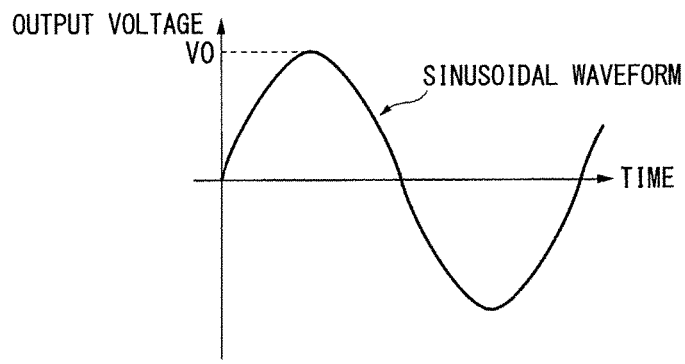
FIGS. 8A to 8D are graphs each showing the output voltage waveform from the power conversion device.
Figure 8B:
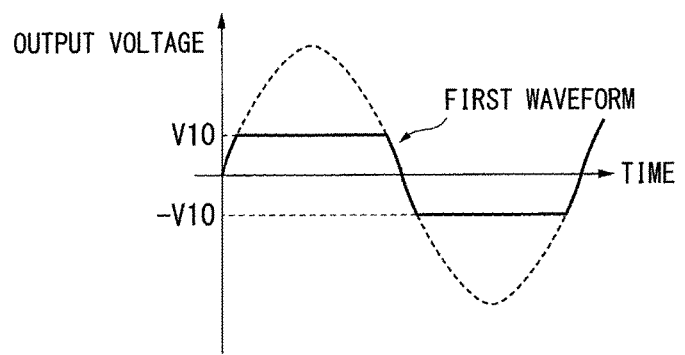

In this example, the sinusoidal waveform of FIG. 8A is the same as the sinusoidal waveform of FIG. 3A. On the other hand, as shown in FIG. 8B, the first waveform is such that the top portion of the same sinusoidal waveform as that of FIG. 8A is flattened to thus limit the output voltage to a level of not higher than a voltage V10. Note that the voltage V10 is set in advance as a voltage lower than the voltage V0 as the amplitude of the sinusoidal waveform.

Figure 8C:
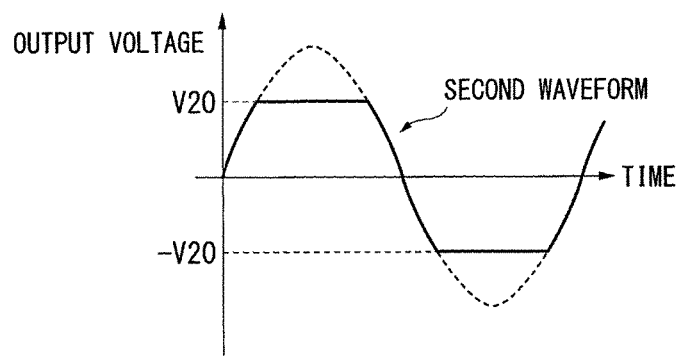

As shown in FIG. 8C, the second waveform is such that the top portion of the same sinusoidal waveform as that of FIG. 8A is flattened to thus limit the output voltage to a level of not higher than a voltage V20. Note that the voltage V20 is set in advance as a voltage lower than the voltage V0 as the amplitude of the sinusoidal waveform and lager than the voltage V10.

Figure 8D:
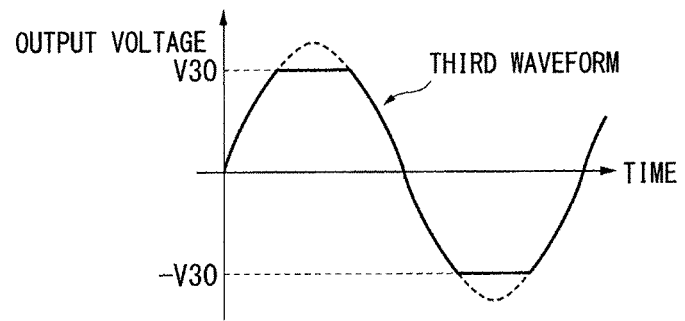

As shown in FIG. 8D, the third waveform is such that the top portion of the same sinusoidal waveform as that of FIG. 8A is flattened to thus limit the output voltage to a level of not higher than a voltage V30. Note that the voltage V30 is set in advance as a voltage lower than the voltage V0 as the amplitude of the sinusoidal waveform and higher than the voltage V20.

Even when waveforms which are different from each other in maximum voltage (i.e., amplitude) are prepared as the first, second, and third waveforms, the effects of the present disclosure can be achieved. Note that the process of selecting an appropriate waveform from among the sinusoidal waveform, the first waveform, the second waveform, and the third waveform shown in FIGS. 8A to 8D and changing the waveform of the output voltage is the same as the process described with reference to FIG. 6. Accordingly, a specific description thereof is omitted.

In the above-described example, the control which changes the waveform of the output voltage in accordance with the peak value $I_P$ of the measured output current has been described. However, the embodiment of the present disclosure is not limited to such control. For example, the embodiment may also be such that the waveform of the output voltage is changed in accordance with an amount of divergence from a target current waveform determined in advance.

The target current waveform and the amount of divergence will be described with reference to FIG. 9. A target current waveform IDS is the waveform of the output current in a hypothetical case where the load 300 is a linear load and an output voltage having a sinusoidal waveform is input to the load. Accordingly, the target current waveform IDS is sinusoidal. It can be said that the target current waveform IDS is an ideal output current waveform to be intrinsically supplied to the load 300. It is desirable that the target current waveform IDS is set as a waveform having as large an amplitude as possible within a range not exceeding the maximum rated current of the switching element 111.

Figure 9:
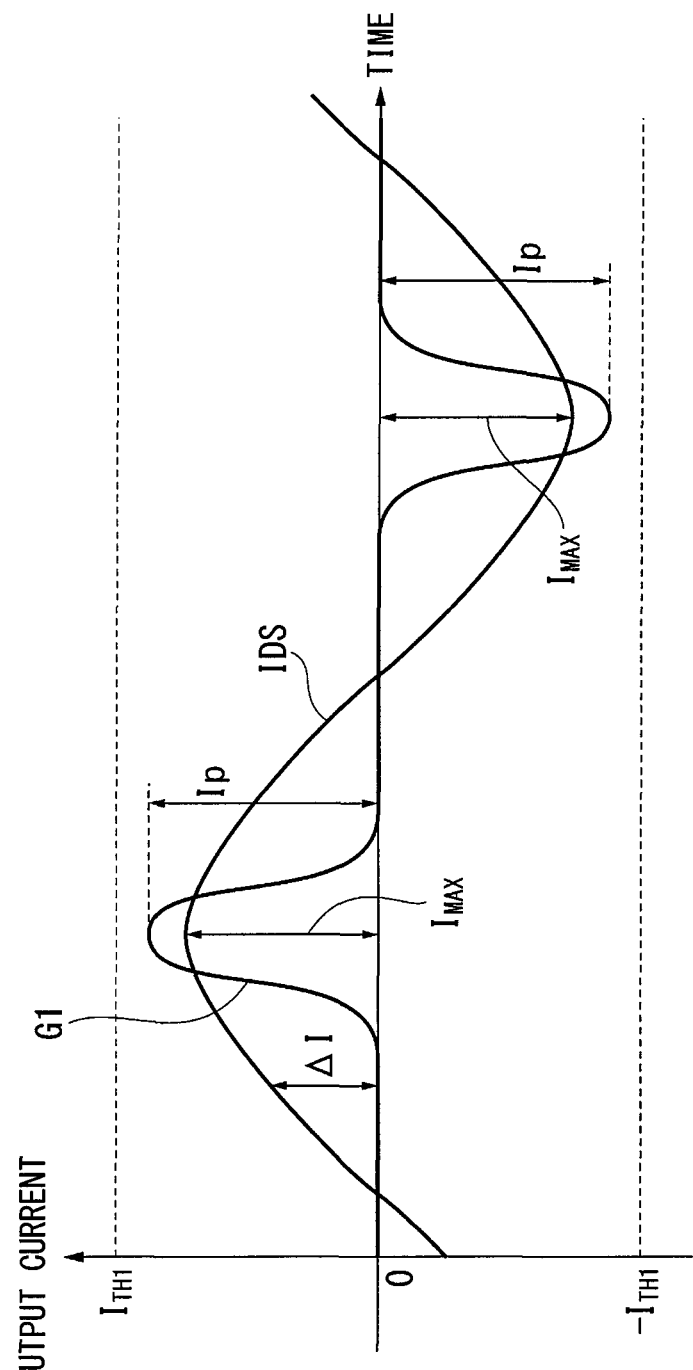
FIG. 9 is a view for illustrating an amount of divergence of an output current.

FIG. 9 shows, as a line G1, the same waveform as the waveform of the output current shown in FIG. 5. An amount of divergence ΔI is defined as the absolute value of the difference between a real output current at each of times and the value of the target current waveform IDS at the same time.

As shown in FIG. 9, the waveform of the output current does not match the target current waveform IDS. Accordingly, the amount of divergence ΔI changes as time elapses. In a hypothetical case where the waveform of the output current matches the target current waveform IDS, the amount of divergence ΔI is constantly 0.

Referring FIG. 10, a description will be given of the specific content of control which changes the waveform of the output voltage on the basis of the amount of divergence ΔI. The sequential process shown in FIG. 10 is performed immediately after the supply of the power from the power conversion device 10 to the load 300 is started, similarly to the process shown in FIG. 6.

First, in S21, the waveform of the output voltage is set to the sinusoidal waveform. That is, the output voltage having the waveform shown in FIG. 3A is input to the load 300.

In S22 subsequent to S21, it is determined whether or not the amount of divergence ΔI (hereinafter referred to simply as the "divergence amount ΔI") calculated on the basis of the value measured by the current meter 120 is larger than a third threshold $I_{TH3}$. The third threshold $I_{TH3}$ is the threshold set as a value corresponding 20% of a current $I_{MAX}$ as the maximum value (amplitude) of the current in the target current waveform IDS ($I_{TH3}=I_{MAX}\times0.2$). When the divergence amount ΔI is constantly not larger than the third threshold $I_{TH3}$, the peak value $I_P$ (and the divergence amount ΔI) need not be suppressed by changing the output voltage so that the sequential process shown in FIG. 10 is ended. After that, the state where the output voltage has the sinusoidal waveform is sustained.

In S22, when the divergence amount ΔI is temporarily (or constantly) larger than the third threshold $I_{TH3}$, the process moves to S23. In S23, the waveform of the output voltage is changed from the sinusoidal waveform to the first waveform. That is, the control unit 130 switches the open/close operations of the switching element 111 such that the waveform of the output voltage is the first waveform of FIG. 3B.

In S24 subsequent to S23, it is determined whether or not the peak value $I_P$ is larger than the first threshold $I_{TH1}$. When the peak value $I_P$ is larger than the first threshold $I_{TH1}$, the process moves to S25.

The peak value $I_P$ which is larger than the first threshold $I_{TH1}$ even after the waveform of the output voltage is changed to the first waveform means that it is impossible to further suppress the peak value $I_P$ and thus allow the peak value $I_P$ to be not larger than the first threshold $I_{TH1}$. Accordingly, when the process moves to S25, the control unit 130 shuts down the power conversion device 10 and ends the sequential process shown in FIG. 10.

Note that, in S24, it is determined whether or not it is necessary to shut down the power conversion device 10 on the basis of, not the divergence amount ΔI as a relative current value, but the peak value $I_P$ as an absolute current value. This reliably prevents the output current from becoming excessively large (e.g., larger than the maximum rated current of the switching element 111 or the like).

In S24, when the peak value $I_P$ is not larger than the first threshold $I_{TH1}$, the process moves to S26. In S26, it is determined whether or not the divergence amount ΔI is constantly smaller than the third threshold $I_{TH3}$ and constantly larger than a fourth threshold $I_{TH4}$. The fourth threshold $I_{TH4}$ is the threshold set as a value corresponding to 10% of the current $I_{MAX}$ as the maximum value (amplitude) of the current in the target current waveform IDS ($I_{TH4}=I_{MAX}\times 0.1$).

When the divergence amount ΔI is constantly smaller than the third threshold $I_{TH3}$ and constantly larger than the fourth threshold $I_{TH4}$, the sequential process shown in FIG. 10 is ended. After that, the state where the output voltage has the first waveform is sustained.

In S26, when the divergence amount ΔI is temporarily (or constantly) not smaller than the third threshold $I_{TH3}$ or temporarily (or constantly) not larger than the fourth threshold $I_{TH4}$, the process moves to S27. In S27, the waveform of the output voltage is changed from the first waveform to the second waveform. That is, the control unit 130 switches the open/close operations of the switching element 111 or the like such that the waveform of the output voltage is the second waveform of FIG. 3C.

In S28 subsequent to S27, it is determined again whether or not the divergence amount ΔI is larger than the third threshold $I_{TH3}$. When the divergence amount ΔI is temporarily (or constantly) larger than the third threshold $I_{TH3}$, the process moves to S35.

The movement of the process to S35 means that, as a result of changing the waveform of the output voltage from the first waveform to the second waveform, the divergence amount ΔI becomes excessively large. Accordingly, in S35, the waveform of the output voltage is returned to the first waveform. Then, the sequential process shown in FIG. 10 is ended. After that, the state where the output voltage has the first waveform is sustained.

In S28, when the divergence amount ΔI is constantly not larger than the third threshold $I_{TH3}$, the process moves to S29. In S29, it is determined whether or not the divergence amount ΔI is constantly larger than the fourth threshold $I_{TH4}$. When the divergence amount ΔI is constantly larger than the fourth threshold $I_{TH4}$, the sequential process shown in FIG. 10 is ended. After that, the state where the output voltage has the second waveform is sustained.

In S29, when the divergence amount ΔI is temporarily (or constantly) not larger than the fourth threshold $I_{TH4}$, the process moves to S30. In S30, the waveform of the output voltage is changed from the second waveform to the third waveform. That is, the control unit 130 switches the open/close operations of the switching element 111 or the like such that the output voltage has the third waveform of FIG. 3D.

In S31 subsequent to S30, it is determined again whether or not the divergence amount ΔI is larger than the third threshold $I_{TH3}$. When the divergence amount ΔI is temporarily (or constantly) larger than the third threshold $I_{TH3}$, the process moves to S34.

The movement of the process to S34 means that, as a result of changing the waveform of the output voltage from the second waveform to the third waveform, the divergence amount ΔI becomes excessively large. Accordingly, in S34, the waveform of the output voltage is returned to the second waveform. Then, the sequential process shown in FIG. 10 is ended. After that, the state where the output voltage has the second waveform is sustained.

In S31, when the divergence amount ΔI is constantly not larger than the third threshold $I_{TH3}$, the process moves to S32. In S32, it is determined whether or not the divergence amount ΔI is constantly larger than the fourth threshold $I_{TH4}$. When the divergence amount ΔI is constantly larger than the fourth threshold $I_{TH4}$, the sequential process shown in FIG. 10 is ended. After that, the state where the output voltage has the third waveform is sustained.

In S32, when the divergence amount ΔI is temporarily (or constantly) not larger than the fourth threshold $I_{TH4}$, the process moves to S33. In S33, the waveform of the output voltage is returned from the third waveform to the sinusoidal waveform. That is, the control unit 130 switches the open/close operations of the switching element 111 or the like such that the output voltage has the sinusoidal waveform of FIG. 3A. Then, the sequential process shown in FIG. 10 is ended. After that, the state where the output voltage has the initial sinusoidal waveform is sustained.

As described above, in the power conversion device 10, the waveform of the output voltage is changed on the basis of the divergence amount ΔI of the output current measured by the current meter 120, and the state where the divergence amount ΔI is constantly small is maintained. This prevents the peak value $I_P$ of the output current from becoming excessively large and excessively small. Such control can also simultaneously suppress the peak value $I_P$ of the output current and suppress the noise (ripple) of the output current.

While the embodiments of the present disclosure have been described hereinabove with reference to the examples, it is to be understood that the disclosure is not limited to those examples. The present disclosure is intended to cover various modification and design changes added to those examples by ordinary skill in the art as long as having the features of the present disclosure. For example, elements of each of the examples described hereinabove, and arrangements, materials, conditions, shapes and sizes are not limited to described examples, but may be appropriately modified. In addition, elements of the embodiments can be combined in any ways as long as they are technically available, and such combinations can be also included in the scope of the present disclosure as long as having the features of the present disclosure.

What is claimed is:

1. A power conversion device comprising:
    an inverter which converts a DC power supplied from a power supply source to an AC power using an operation of a switching element and outputs the AC power toward a load;
    a current measurement unit which measures an output current from the inverter; and
    a control unit which controls the operation of the switching element to change an output voltage waveform from the inverter,
    wherein the control unit changes the output voltage waveform on the basis of the measured output current,
    wherein the control unit changes the output voltage waveform when a peak value of the output current exceeds a first threshold determined in advance, and
    wherein the control unit changes the output voltage waveform such that the peak value of the output current is larger than a second threshold determined in advance and not larger than the first threshold, an absolute value of the second threshold being smaller than an absolute value of the first threshold.

2. The power conversion device according to claim 1, wherein the first threshold is determined such that the output current does not exceed a maximum rated current of the switching element.

3. A power conversion device comprising:
    an inverter which converts a DC power supplied from a power supply source to an AC power using an operation of a switching element and outputs the AC power toward a load;
    a current measurement unit which measures an output current from the inverter; and a control unit which controls the operation of the switching element to change an output voltage waveform from the inverter, wherein the control unit changes the output voltage waveform on the basis of the measured output current, wherein the output voltage waveform is changed such that an amount of divergence of the output current from a target current waveform determined in advance is constantly not larger than a predetermined third threshold, and wherein the target current waveform changes over time.

* * * * *